May 19, 1931.  R. W. MUELLER  1,806,305
OPERATING MECHANISM FOR VALVES
Filed Dec. 24, 1927
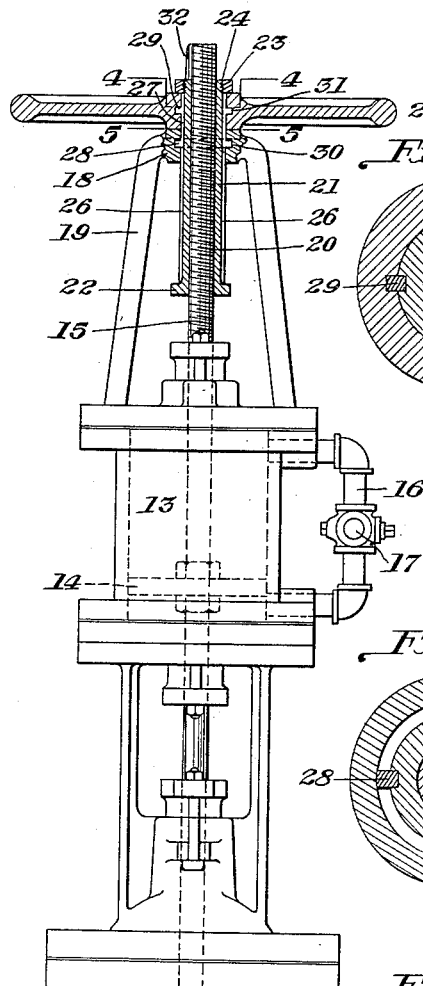
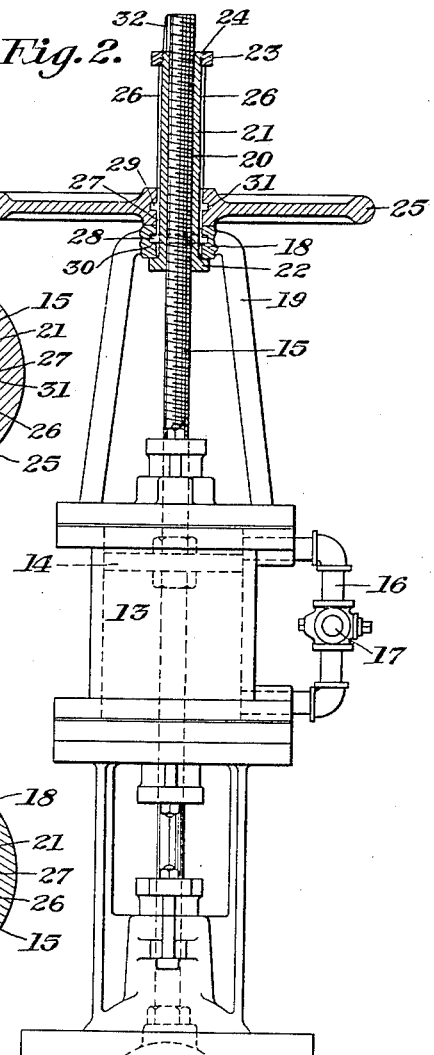
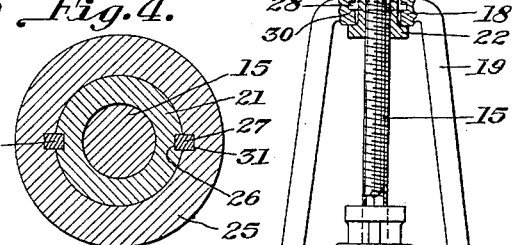
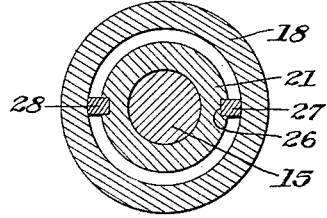
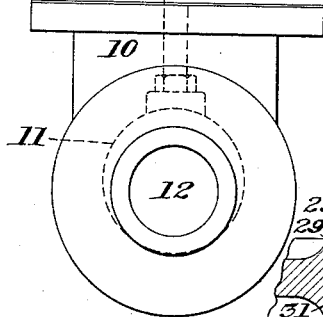
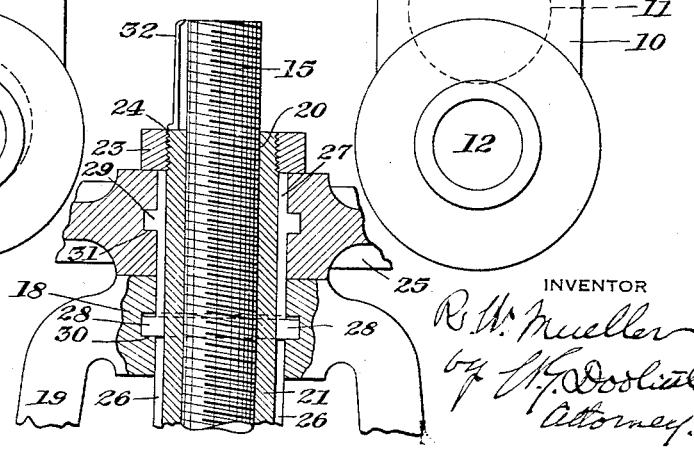
INVENTOR
R. W. Mueller
by W. G. Doolittle
Attorney.

Patented May 19, 1931

1,806,305

UNITED STATES PATENT OFFICE

RICHARD W. MUELLER, OF PITTSBURGH, PENNSYLVANIA, ASSIGNOR TO KEROTEST MANUFACTURING COMPANY, OF PITTSBURGH, PENNSYLVANIA, A CORPORATION OF PENNSYLVANIA

OPERATING MECHANISM FOR VALVES

Application filed December 24, 1927. Serial No. 242,358.

This invention relates to a novel operating mechanism for valves, for example, gate valves, and the invention contemplates an efficient and durable construction which may be manufactured at minimum cost, and which is capable of selective operation by hand or by power.

A prime object is to provide a structure wherein the valve per se operable by means of a piston and power fluid or other power means, has a screw rod to which a bushing or sleeve is threaded, which sleeve is slidable and rotatable relatively to the valve casing, and has stop means to limit its axial movement, in combination with a hand wheel mounted and operable to cause sliding movement of the sleeve.

A further prime aim is to provide the elements so relatively movable that the valve may be but partly opened and so held as to prevent unbalanced line pressure from further opening of the valve.

Still another object is to provide the valve structure with means whereby the position of the valve may be predetermined, especially prior to power actuation thereof, so that sufficient clearance may be allowed for opening and closing of the valve without injurious contact of any of the elements, and especially of the stop means of the sleeve or bushing with the co-acting elements.

Additional objects and advantages will in part be pointed out and otherwise become apparent from a consideration of the following description taken in connection with the accompanying drawings illustrating an operative embodiment.

In the said drawings:

Fig. 1 is a view partly in elevation and partly in central axial section, illustrating my improvements in connection with a gate valve structure, the gate being in closed position;

Fig. 2 is a view similar to Fig. 1, but showing the gate in the open position;

Fig. 3 is an enlarged fragmentary longitudinal sectional view through the valve-operating stem, sleeve and associated parts of the structure;

Fig. 4 is a cross sectional view taken on the line 4—4 of Fig. 1; and

Fig. 5 is a cross sectional view taken on the line 5—5 of Fig. 1.

Referring specifically to the drawings, 10 designates a built-up valve casing or housing in which a valve per se is shown at 11 for sliding movement toward and away from a passage, as at 12, to close and open the same. Such structure is to be taken as general and conventional, but may specifically be a gate valve as used in connection with oil well pipe lines, although no limitation in this regard is to be implied, since the improvements relate to valves generally.

The valve casing 10 has a cylinder or chamber 13 formed or supported therein, in which a piston head 14 is slidable. Extending from the valve 11 is a suitably guided and packed stem 15 whose outer end portion is in the form of a screw rod. Such stem has the piston 14 rigidly keyed or connected thereto in any suitable manner. Communicating with the interior of cylinder 13 above and below the piston head 14 is a line of piping 16 having a four-way valve 17 therein. Said valve 17 is arranged to communicate with a suitable source of power medium or fluid to move the piston 14, and accordingly valve 11, in opposite directions to respectively open and close the passage 12. The power fluid may be supplied from any suitable source and under appropriate control and, for example, may be steam or compressed air, or any liquid under pressure.

The screw rod or stem 15 projects beyond the cylinder 13 and through the crown 18 of a yoke or supporting member 19 surmounting the cylinder 13 or otherwise forming a part of the casing 10. In screw-threaded engagement, as at 20, with the screw rod 15, is a bushing or sleeve 21, which has integral therewith at one end a flange or stop 22 adapted to engage the under surface of the crown 18, as shown in Fig. 2 to limit the outward movement of the sleeve. A stop 23 is provided at the other end of the sleeve 21 and may be in the form of a nut screw-threaded as at 24 to said sleeve.

Resting on the upper surface of the crown 18 and adapted for rotation is a hand wheel 25. Said stop 23 is adapted for engagement with the upper surface of the hub of the hand wheel 25, as shown in Fig. 1, to limit the movement of the valve 11 to closed position.

Disposed longitudinally of the sleeve 21 in the periphery thereof, are one or more, for instance two, grooves or slots 26. Disposed in said slots 26 are keys 27 along which the sleeve 21 may slide. Said keys, for the major portion thereof, are disposed completely within the periphery of the sleeve 21, but they have spaced lugs 28 and 29 projecting outwardly therefrom. The lugs 28 are disposed in an annular groove 30 formed in the crown 18 and the lugs 29 are disposed in and snugly fit recesses 31 in the hand wheel 25, so that the hand wheel 25 and sleeve 21 may be turned unitarily, with the sleeve 21 also sliding or displacing axially through the hand wheel 25 and correspondingly moving the valve 11 to open and closed position, according to the direction of movement.

The structure described affords two means of moving the valve 11 to both open and closed positions, namely, that controlled by power at the valve 17 and that controlled by hand operation at the wheel 25.

The bushing or sleeve 21 is designed so that the valve 11 may be partly opened and with the stop 22 jammed against the crown 18, to prevent unbalanced line pressure from further opening the valve.

The parts must be so proportioned that, in the position of Fig. 1 or closed condition of the valve, the distance between the stop 22 and the crown 18 is slightly greater than the axial travel of the valve 11.

If the parts are not always in the same relation as shown in the drawings, it will be realized that power actuation of the structure would result in such forcible contact of the stops 22 and 23 with the crown head 18 and wheel 25 as to fracture or injure the parts, especially if their adjustment has been changed from that shown. In order to always permit the position of the parts to be checked up so that the operator is sure there is sufficient clearance for proper movement of the valve to closed or open position, an indicator 32 is provided, which may consist of a rod rigid with the sleeve 21 and terminating at the outer end in the same plane which the outer end of the stem 15 should occupy when the aforesaid sufficient clearance is provided for.

Presuming operation of the device by power, the valve 17 is operated with the parts in the position of Fig. 1, so that the power fluid passes through the piping 16 into the cylinder 13 beneath the piston 14, thereby elevating such piston 14 and moving the valve 11 from its seat 12 to open position, corresponding to the position of the parts as shown in Fig. 2. To permit the sliding movement of the valve away from its seat as aforesaid, the stem 15 and sleeve 21 unitarily slide on the keys 27 and through the opening in the crown 18 and hand wheel 25, moving to the position of Fig. 2.

The valve 17 may be operated to slide to proper position so that the power fluid will enter the cylinder 13 above the piston 14 and force it downwardly, when it is desired to close the valve, that is, return it from the position of Fig. 2 to the position of Fig. 1.

In lieu of operation by the power means described, the device may be opened and closed by hand operation through the rotation of the hand wheel at 25. Incidental to such hand operation, the valve 17 is positioned so as to exhaust air or fluid from the cylinder 13 in front of the piston 14, according to the direction in which the piston 11 is to move. Through the turning or rotation of the hand wheel 25, the sleeve 21 is caused to turn, moving axially from the position of Fig. 1 to that of Fig. 2, first having a movement independent of the stem 15 until the stop 22 engages the head 18, after which the sleeve 21 simply rotates and through its co-action with the threads of the stem 15, causing the latter to move axially, and accordingly unseat the valve 11. During this movement, while the hand wheel 25 turns, it cannot move axially since it is anchored against such movement by the projection of the lugs 28 of the keys 27 into the annular groove 30.

The movement of the valve by hand operation to closed position is, of course, the opposite to that just traced, it being particularly noted that the sleeve 21 first moves rotatably and axially independently of the stem 15 until the stop 23 engages the hub of the hand wheel 25, after which the rotation of such sleeve will cause sliding of the stem 15 and lowering or seating of the valve 11.

Various changes may be resorted to within the spirit and scope of the invention.

I claim as my invention:

1. A valve structure comprising a valve having a threaded valve stem, a plurality of independently operable means both located outside of the valve structure and operable independently of the fluid pressure in the valve structure positioned to operate the valve, and a displaceable device comprising a threaded sleeve forming part of one of said means and cooperating with the stem to enable operation of either means while both means are connected for operation.

2. In combination, a valve or the like, a sleeve threaded thereto, means mounting the sleeve for rotation and sliding movement, whereby the sleeve and valve may unitarily slide so that the latter may be actuated by means independently of the sleeve, an actuating means through which the sleeve and adjacent part of the valve slides, and non-axially movable rotatable means to turn the last mentioned means as a second device to actuate the valve.

3. A valve structure having a valve member provided with a screw-threaded portion, a sleeve screw-threaded thereon, means mounting the valve member and sleeve for unitary sliding movement, a rotatable operating member mounted by said means, and a connection between the sleeve and said operating member to cause the sleeve to turn with said member and also slide therethrough.

4. A valve structure having a valve member provided with a screw-threaded portion. a sleeve screw-threaded thereon, means mounting the valve member and sleeve for unitary sliding movement, a rotatable operating member mounted by said means, and a connection between the sleeve and said operating member to cause the sleeve to turn with said member and also slide therethrough, and two stop means on the sleeve to respectively engage the first mentioned means and said rotatable operating member.

5. A valve structure having a valve member provided with a screw-threaded portion, a sleeve screw-threaded thereon, means mounting the valve member and sleeve for unitary sliding movement, a rotatable operating member mounted by said means, and a connection between the sleeve and said operating member to cause the sleeve to turn with said member and also slide therethrough, stop means on said sleeve to engage a part of the structure in its path of travel, and means to indicate the relative position of the valve prior to one of its movements.

6. A gate valve structure having a valve member and a threaded stem, means to operate said valve by hand including a sleeve threaded to the stem and mounted for rotation and sliding movement, means to operate said valve by power, the first mentioned means including a device movable with the sleeve and co-acting with the stem to indicate the relative positions of its parts prior to an actuating movement of the power means.

7. A valve structure having a valve member provided with a screw-threaded stem, a sleeve in screw-threaded engagement with said stem, an operating wheel, a mounting member carrying said operating wheel, said stem and sleeve passing through said mounting member and operating wheel, a key having a projection anchored in the operating wheel and a projection interiorly of the mounting member, said mounting member having an annular groove accommodating the last mentioned projection, said key aside from said projections being located within the periphery of said sleeve.

8. A valve structure having a valve member provided with a screw-threaded stem, a sleeve in screw-threaded engagement with said stem, an operating wheel, a mounting member carrying said wheel, said stem and sleeve passing through said mounting member and operating wheel, a key having a projection anchored in the operating wheel and a projection interiorly of the mounting member, said mounting member having an annular groove accommodating the last mentioned projection, said key aside from said projections being located within the periphery of said sleeve, stop members on said sleeve engageable respectively with said mounting member and said wheel according to its direction of movement, and means on said sleeve to indicate the relative positions of the parts prior to the actuation of the valve.

9. A valve structure including a casing having a cylinder, a valve member having a stem, a piston on said stem located within said cylinder, means for the supply of a power medium to the cylinder for actuation of the piston to control opening and closing of the valve, said stem having screw threads, a sleeve in screw-threaded engagement with the threads of said stem, means mounting said sleeve and stem for unitary sliding movement incidental to actuation of the valve through movement of said piston, and a manually operable member having a connection with said sleeve to turn the same and permit sliding movement thereof through the manually operable member.

10. In combination, a gate valve having a rising stem having a threaded portion, means for power actuation of the valve, means for manual actuation of the valve. both of said means located outside of the valve proper and operable independently of the fluid pressure within the valve, said manual means having a displaceable threaded sleeve cooperating with the stem to enable operation of either means while both means are connected for operation.

In testimony whereof I affix my signature.

RICHARD W. MUELLER.